United States Patent [19]

Lindblom

[11] Patent Number: 5,193,637
[45] Date of Patent: Mar. 16, 1993

[54] HYDRAULIC STEERING SYSTEM FOR ARTICULATED AUTOMOTIVE VEHICLE

[75] Inventor: Sture Lindblom, Eskilstuna, Sweden

[73] Assignee: VME Industries Sweden AB, Eskilstuna, Sweden

[21] Appl. No.: 668,507

[22] PCT Filed: Oct. 5, 1989

[86] PCT No.: PCT/SE89/00547
  § 371 Date: Mar. 26, 1991
  § 102(e) Date: Mar. 26, 1991

[87] PCT Pub. No.: WO90/03909
  PCT Pub. Date: Apr. 19, 1990

[30] Foreign Application Priority Data
  Oct. 5, 1988 [SE] Sweden ............................. 8803534

[51] Int. Cl.[5] ............................................. B62D 5/12
[52] U.S. Cl. .................................... 180/139; 180/134; 91/34
[58] Field of Search ............... 180/136, 139, 134, 137, 180/162; 91/34; 280/426

[56] References Cited

U.S. PATENT DOCUMENTS 4,081,961  4/1978  Dwyer ................................. 180/139

FOREIGN PATENT DOCUMENTS 2110725  4/1984  Fed. Rep. of Germany.
350227  10/1972  Sweden.
407545  4/1979  Sweden.
0761345  9/1980  U.S.S.R. .............................. 180/139

Primary Examiner—Margaret A. Focarino
Assistant Examiner—Anne Marie Boehler
Attorney, Agent, or Firm—Young & Thompson

[57] ABSTRACT

A hydraulic steering system for turning two mutually articulated vehicle-halves (13, 14) relative to one another with the aid of two hydraulic piston-cylinder devices (11, 12) includes a control valve (17) which will normally connect the piston-cylinder devices in a manner such that the devices operate as single-acting piston-cylinder devices. When abnormally high steering torque prevails, however, and the oil pressure rises correspondingly above a pre-determined value, the setting of the control valve is adjusted by these oil pressures so that the valve connects the piston-cylinder devices in a manner which causes the devices to operate as double-acting piston-cylinder devices.

3 Claims, 3 Drawing Sheets

HYDRAULIC STEERING SYSTEM FOR ARTICULATED AUTOMOTIVE VEHICLE

The present invention relates to a hydraulic steering system for an automotive vehicle comprising two halves which are mutually articulated and can be swung by two cylinder-piston devices one of which is disposed on each side of the vehicle.

The invention relates primarily to steering systems for heavy automotive vehicles such as the types of machine used by contractors or entrepeneurs and being of the kind which have two mutually articulated vehicle-halves. The relative positions of these vehicle-halves are adjusted with the aid of two piston-cylinder devices to which pressure oil is pumped via a control valve, which may be manipulated by means of the vehicle steering wheel or with the aid of a steering stick. The pump rotates at the same speed as the engine of the vehicle, and has a selected displacement which is sufficiently large to ensure that the quantity of oil delivered each minute will result in satisfactory adjustment of the mutual relative positions of the two vehicle halves to a desired steering position. In the case of known steering systems of this kind, the piston-cylinder devices are double-acting and cross-connected, so that when the first chamber of one cylinder device is connected to the pump, the second chamber of the other cylinder device is also connected to the pump. This arrangement is chosen so that whenever applicable, considerable resistance can be overcome when steering the vehicle in terrain where the ground is soft, and in other instances when the steering torque is unusually large. The drawback with this arrangement, however, is that the system becomes overdimensioned for those operating conditions which occur most often in practice, i.e. conditions in which the vehicle is often on relatively firm ground or very firm ground, such as a road surface, and the steering resistance is relatively slight.

Consequently, one of the drawbacks of the known steering systems resides in the need to dimension the pump in a manner to satisfy the requirement of a relatively large flow of pressure oil in conditions where large steering torques prevail. In the case of control valves which are connected to the steering wheel of the vehicle, the valve is normally of such construction as to make it necessary to choose larger valves for larger flows of pressure oil. An example of the steering system under consideration is known from SE-B-407 545.

Accordingly, the object of the present invention is to provide a steering system which enables a considerably smaller and considerably less expensive pump to be used, and also a considerably smaller and less expensive control valve, while still maintaining satisfactory steering possibilities, both when steering resistance is normally relatively low and when said resistance is abnormally high.

This object is achieved with a steering system of the aforedescribed kind having, in accordance with the invention, the characterizing features set forth below.

In short, it can be said that in the case of the inventive steering system, the two steering cylinders are connected together with the aid of a directional valve such as to function as single-acting piston-cylinder devices during normal steering conditions, resulting in approximately half the flow of pressure oil to the first chamber of one or the other of said cylinder devices compared with cross-connected piston-cylinder devices, at the same time as the second chambers of the two piston-cylinder devices are connected to the return tank of the system. Consequently, the pump and the control valve can be made correspondingly smaller, which in turn results in considerably reduced purchase costs.

If, in an exceptional case, the steering torque should be abnormally high, the pressure in the pump line to the first chamber of one cylinder will rise and when this pressure has increased to a level above a pre-determined value, the inventive directional valve will be adjusted under the influence of said pressure to a position in which it connects the second chamber of the second piston-cylinder device to the pump, such that the two piston-cylinder devices will only be cross-connected for the purpose of increasing the steering torque during these seldomly occurring conditions. The directional valve can be of simple and inexpensive design, and consequently the cost savings afforded by the novel inventive system are quite considerable. A smaller pump also results in smaller heat losses, in other words resulting in a corresponding saving of energy.

A number of exemplifying embodiments of the inventive steering system are illustrated in the accompanying drawings, in which FIG. 1 illustrates a first embodiment of a coupling circuit;

Figure 1:
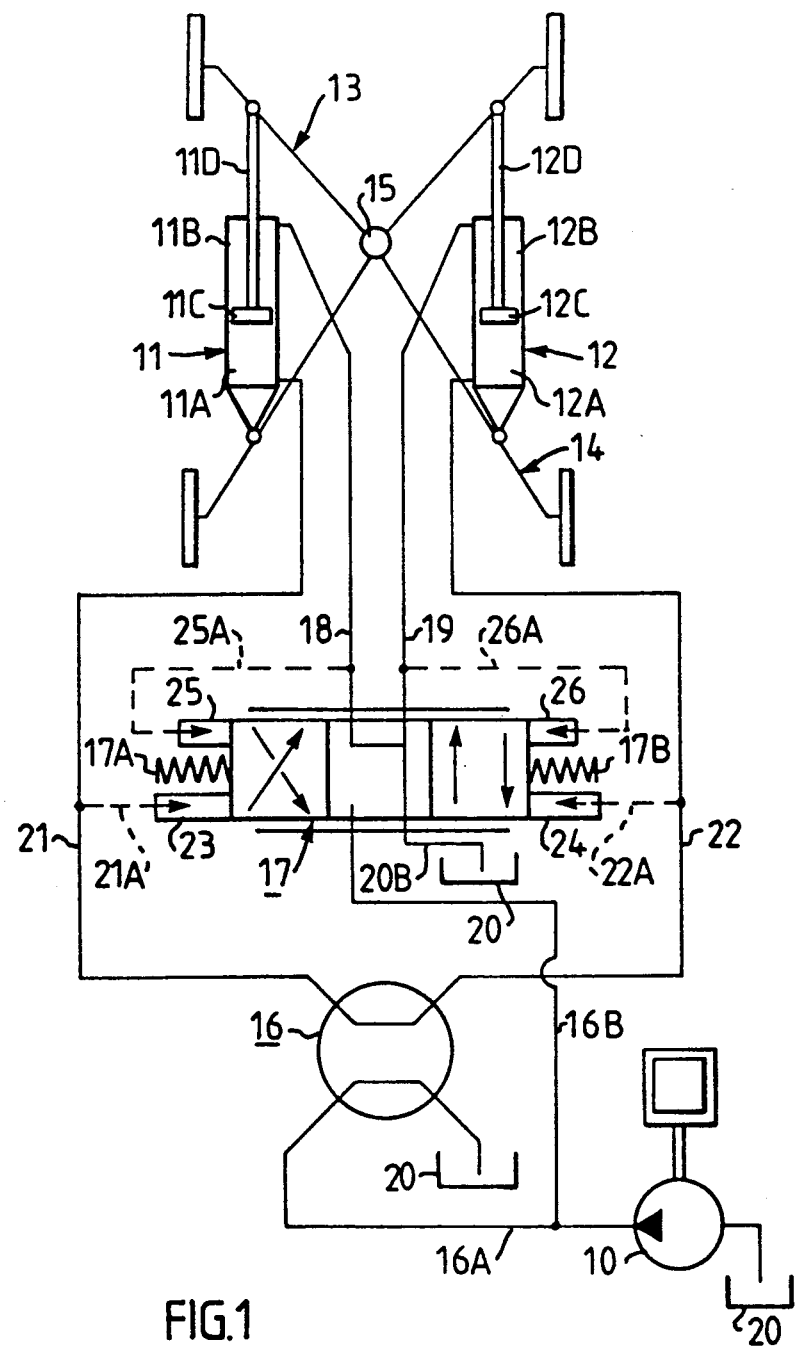

In the case of the illustrated embodiments, an oil pump 10 is driven by a motor (not shown). The pump supplies two steering piston-cylinder devices 11, 12 which are connected to two vehicle-halves 13, 14, pivotally connected together on a pivot journal 15.

The pump supplies pressure oil to a known control valve 16, through a pump line 16A. In the case of the FIG. 1 embodiment, the control valve is connected to the steering wheel of the vehicle and is constructed so that when the steering wheel is turned in one direction the pump is connected, for instance, to the first chamber 11A of one piston-cylinder device 11, while the second chamber 12B of the second piston-cylinder device 12 is connected, at the same time, to the return tank 20. When the steering is turned in the opposite direction, the pump is connected to the first chamber 12A of the other piston-cylinder device 12.

The pump also supplies pressure oil, via a branch line 16B, to a directional valve 17, which is shown in its central position and which can be adjusted to its left or right terminal positions in the figures.

Each of the piston-cylinder devices has a respective piston 11C and 12C which divide the cylinders of said devices into the first and the second chambers 11A, 11B and 12A, 12B respectively. The pistons are connected to the front vehicle-half 13 by means of piston-rods 11D, 12D.

The control valve 16 is constructed to portion-out oil in volumes corresponding to the angle of valve rotation, which in turn corresponds to given rotation of the vehicle steering wheel and causes the front vehicle-half 13 to be turned to a corresponding extent. Normally, it is necessary to turn the steering wheel through three to four revolutions in order to swing the front vehicle-half from one terminal position to the other.

When the directional valve 17 is adjusted to its central position, the second chambers 11B, 12B of respective piston-cylinder devices are connected, via lines 18, 19, to a return line 20B leading to the tank 20. The branch line 16B is closed by the directional valve 17, as illustrated in FIG. 1, whereas the pump line 16A can be connected to the first chamber 11A or 12A of the one or the other piston-cylinder device, subsequent to rotating the control valve in one or the other direction from its central position.

In one direction, the pressure-controlled directional valve 17 is activated by the pressure prevailing in the line 21, via a branch line 21A, and by the pressure prevailing in the line 22, via a branch line 22A. The valve 17 is held in its central position under normal conditions, by two springs 17A and 17B.

Under normal conditions, where steering torque is relatively small, the pressure prevailing in the line 21 or line 22 will lie beneath a pre-determined value P, and is therewith insufficient to change the position of the valve 17 against the force exerted by either spring.

This means that the pump 10 need only supply the one first chamber 11A or the other 12A. Since this suffices for the steering torques required in the majority of conditions, the pump and the control valve may be of considerably smaller dimensions than those required when the steering piston-cylinder devices are permanently cross-coupled in accordance with known techniques.

If, however, the front vehicle-half 13 meets unusually high resistance when turning, the pressure in, for instance, the line 21 will increase and, in certain instances, to an extent such as to exceed the pressure P. When this occurs, the spring 17B is unable to resist the higher pressure and the valve 17 will be adjusted to its right terminal-position. The branch line 16B of the pump is therewith connected to the line passing to the second chamber 12B of the second piston-cylinder device 12, while the first chamber 11A of the first piston-cylinder device 11 remains connected to the pump. The two steering piston-cylinder devices are only cross-connected for the purpose of increasing the steering torque, when these seldomly occurring conditions are found.

Under these conditions, the second chamber 11C of the first piston-cylinder device and the first chamber 12A of the second piston-cylinder device 12 are connected to the tank 20.

Similarly, when the pressure in the line 20 exceeds the pre-determined pressure value P, the valve 17 will be adjusted to its left terminal-position, so as to cross-couple the steering cylinders for turning the vehicle in the other direction.

The pressure in the branch line 21A activates the valve 17 via a pilot-area 23, and the pressure in the branch line 22A activates the valve 17 via a pilot-area 24.

When the valve 17 is adjusted towards either of its terminal positions, there is a risk that the valve will oscillate as a result of the alternating pressure-conditions in the lines. This risk is eliminated by pilot-areas 25, 26, of which the area 25 is connected to the line 18, via a line 25A, and the area 26 is connected to the line 19, via a line 26A.

The valve 17 is in balance when:

$$P21 \times A23 = P19 \times A26 + F17B \quad (1)$$

$$P22 \times A24 = P18 \times A25 + F17B \quad (2)$$

where

P21 = pressure in the line 21
A23 = the pilot-area 23
P19 = pressure in the line 19
A26 = the pilot-area 26
F17B = spring force 17B
P22 = pressure in the line 22
A24 = the pilot-area 24
P18 = the pressure in the line 18
A25 = the pilot-area 25
F17B = the spring force 17B.

As soon as the requisite steering torque falls to normal values, the pressure in the line 21 or the line 22 will fall beneath the pre-determined limit pressure P, causing the directional valve 17 to return to its central position.

Figure 2:
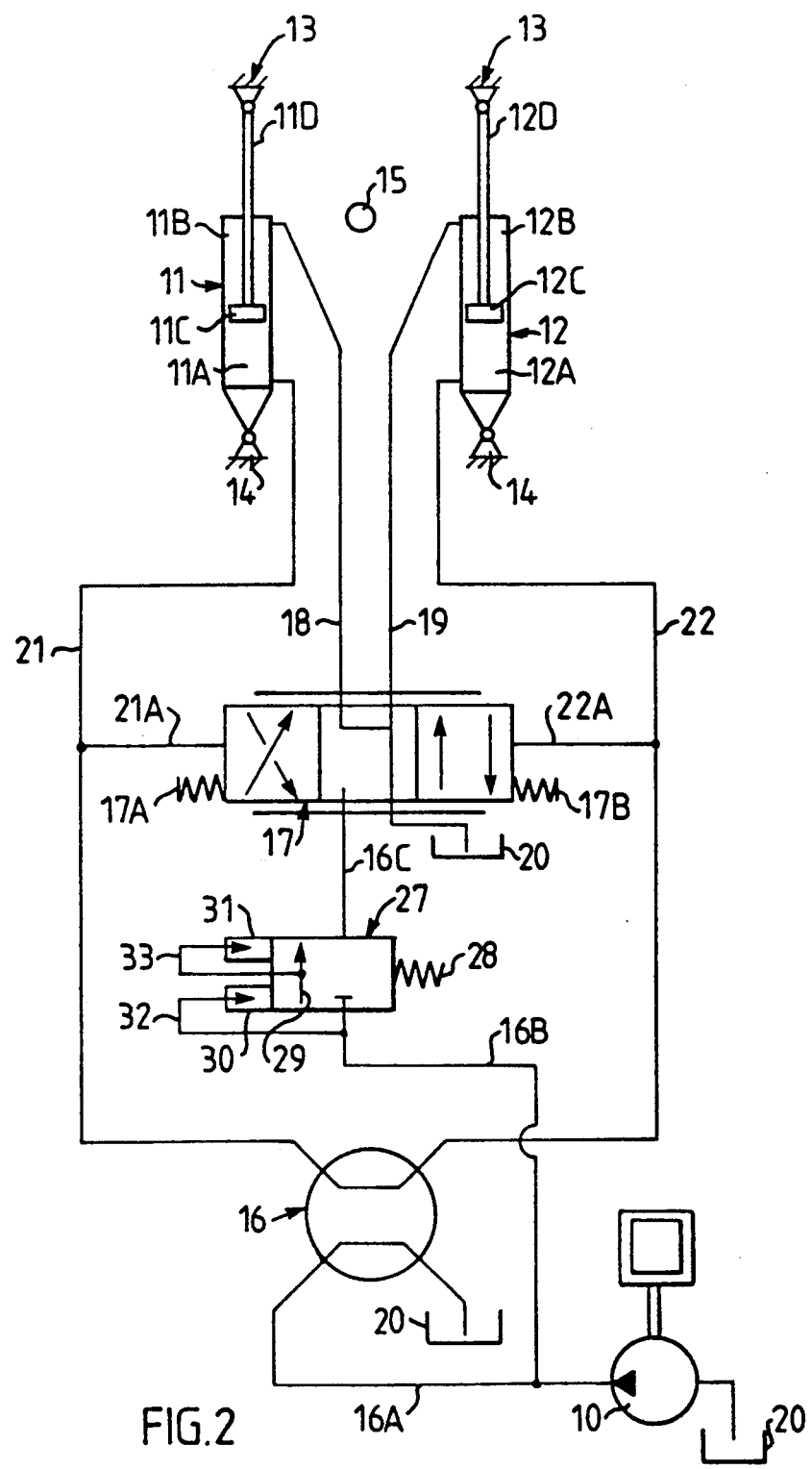
FIG. 2 illustrates a second embodiment of a coupling circuit.

FIG. 2 illustrates a steering system which coincides essentially with the system illustrated in FIG. 1. The pilot-areas 23, 24, 25, 26 of the FIG. 1 embodiment has been omitted from the FIG. 2 embodiment and the pressure in the branch lines 21A, 22A instead acts directly on the spring-operated valve 17, which is controlled by the pressures prevailing in lines 21 and 22 in a manner to steer pressure oil arriving from 16C to the correct chamber 11B or 12B respectively.

In this case, oscillation of the valve 17 upon adjustment from its central position is prevented with the aid of a sequence valve or auxiliary valve 27, which is normally in the illustrated left and closed neutral setting, in which the valve interrupts the connection between the branch line 16B of the pump and a pressure line 16C leading to the valve 17. The valve 27 can be adjusted from its left position illustrated in FIG. 2 to its right position against the action of a spring 28. The valve includes a passage 29, which now connects the lines 16B and 16C together. The valve is operated by means of two pilot-areas 30, 31, of which one area 30 is connected to the line 16B, via a line 32, and the other area 31 is connected to the connecting passage 29, via a line 33.

When the pressure in the branch line 16B rises above the pressure P, a corresponding pressure is obtained in the branch line 21A or 22A, such as to move the valve from its central position to its right or left position respectively. This pressure acts via the pilot-area 30 and re-sets the valve 23 in its open, right terminal-position, in which valve position the pressure prevailing in the passage 21 will now act on the valve 27, via the pilot-area 31, and assist in holding the valve in its right terminal-position until the pressure conditions have been stabilized by re-setting of the valve 27.

In order for pressure oil to arrive via the line 16C, it is therefore necessary for the valve 27 to open the connection between the lines 16B and 16C. This takes place when the pressure in the line 16B has reached the pressure P, so that $P \times A30 = F28$, in which A30 is the area 30 and F28 is the spring force 28. As soon as the valve 27 has opened, the pressure prevailing in the line 16B will also act on the pilot-area 33. Because the pressure P now acts on both the pilot-area 30 and the pilot-area 33, the valve 27 will be held open even when the pressure in the line 16B falls beneath the opening pressure $P = F28 \div A30$.

As soon as the pressure falls beneath the pressure P2 in the line 16B, in which $P2 = F28 \div (A30 + A31)$, the valve 27 is returned to its left terminal-position by the spring 28.

Figure 3:
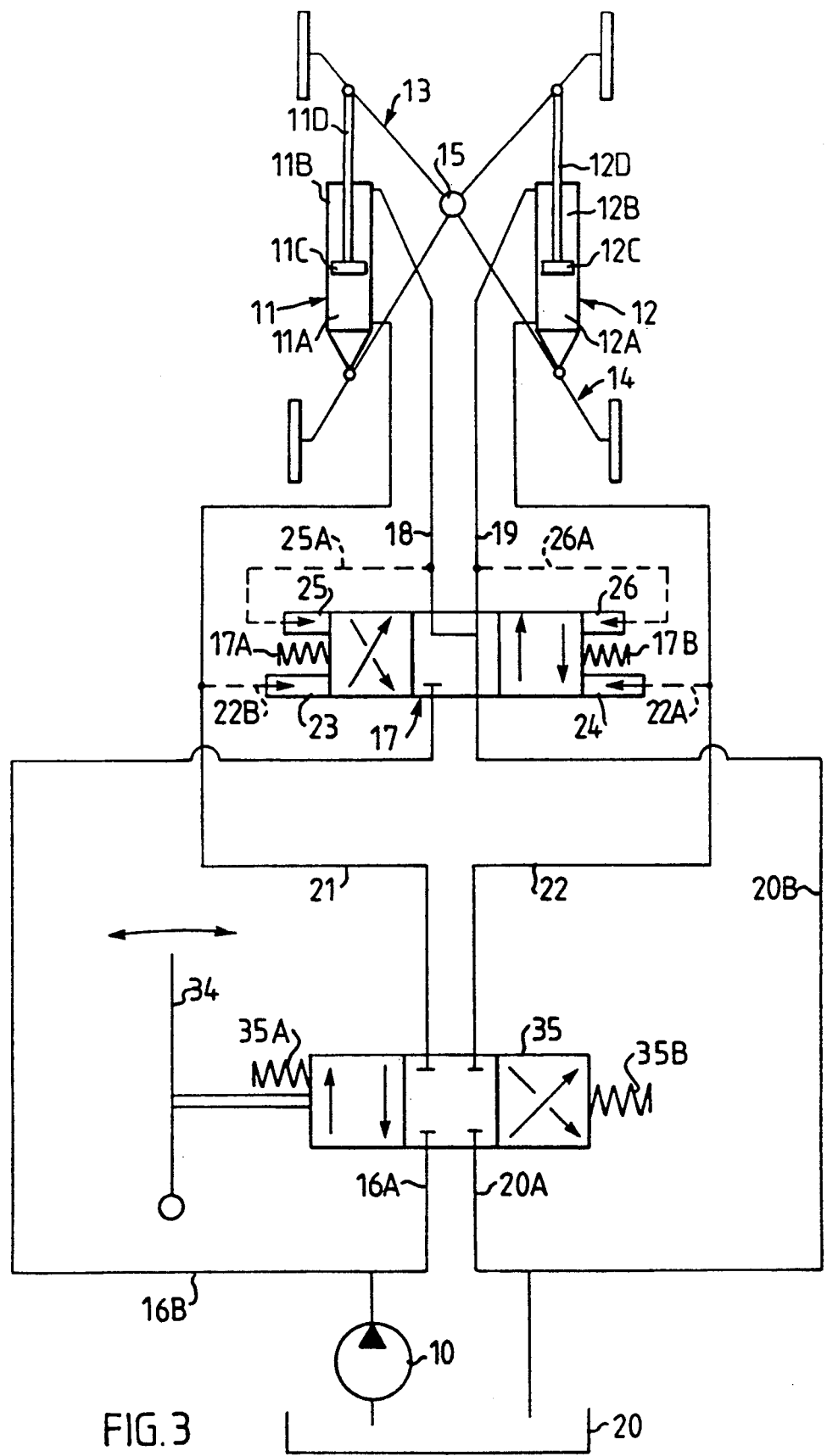
FIG. 3 illustrates a modified embodiment in which the steering-wheel activated control valve shown in FIG. 1 is replaced with a stick-activated control valve.

Finally, FIG. 3 illustrates an embodiment in which a control valve 35, which is biased in a direction towards its central position by two springs 35A, 35B, and which is capable of being moved from said central position in either direction by means of a steering stick 34.

The valve 35 has four ports connected to four lines, of which the line 16A from the pump and a line 20A leading to the tank 20 are connected to one side of the valve in the figure, whereas the lines 21, 22 are connected to the other side of the valve.

When the valve 35 is moved, for instance, to its right terminal-position with the aid of the stick 34, the pump 10 is connected with the line 21 and with the first chamber 11A of the first piston-cylinder device 11. The line 20A is, at the same time, connected to the line 22 which connects the first chamber 12A of the second piston-cylinder device 12 to the tank 20.

The second chambers 11B, 12B of the two piston-cylinder devices are connected to the tank 20 via the lines 18, 19 and the line 20A.

When the pressure in the lines 16A, 16B increases to a value above the pressure P due to an exceptionally large steering torque, the valve 17 will be adjusted to its right terminal-position, with the result described above with reference to FIG. 1.

The front vehicle-half will continue to turn for as long as the stick 34 is held in one or the other of its terminal positions. This turning movement is interrupted by returning the stick to its central position. The advantage of a steering stick in comparison with a rotatable steering wheel is that the stick is less strenuous when working over relatively long periods.

I claim:

1. A hydraulic steering system for an automotive vehicle comprising two vehicle halves (11, 12) which are mutually articulated on a journal pivot (15) and can be swung by means of two hydraulic piston-cylinder devices each of which has a first chamber (11A, 12A) and a second chamber (11B, 12B) on respective sides of a piston connected to a piston rod (11D, 12D) in said piston-cylinder devices, and which is connected to a pressure-oil pump (10) via a control valve (16, 35) adjustable by means of vehicle steering means and a directional valve which can be adjusted to either one of its two terminal positions by means of said oil pressure, such as to effect desired swinging of the vehicle halves relative to one another, and in which system adjustment of the control valve, while maintaining the directional valve in its central position between said two terminal positions, from a central position causes the first chamber (11A or 12A) of one piston-cylinder device (11 or 12) to be connected to the oil pump, while the first chamber (12A or 11A) of the other piston-cylinder device is connected, at the same time, to a return tank (20), therewith causing the piston-cylinder devices to operate as a single-acting device, whereas simultaneous adjustment of the directional valve (17) to either of its two terminal positions under the influence of oil pressure in respective lines between the pump and the first chamber of the one or the other piston-cylinder device will also result in a connection between the pump and the second chamber (11B, 12B) of said other and said one piston-cylinder device respectively such as to cross-connect the two piston-cylinder devices, characterized in that the directional valve (17) steered by pressure oil in either direction is spring-biased (17A, 17B) in a manner such that the directional valve is held by spring forces in its central position until the oil pressure rises above a predetermined value, whereby at oil pressures beneath said pre-determined oil pressure and at correspondingly low steering resistances the hydraulic piston-cylinder devices are coupled to function as single-acting piston-cylinder devices, whereas when the oil pressure rises as a result of a corresponding increase in steering resistance, the directional valve (17) is moved to either one of its terminal positions, such as to couple the hydraulic piston-cylinder devices in a manner to operate as double-acting piston-cylinder devices, and pressure lines (18, 19) extending between the directional valve (17) and the second chambers (11B, 12B) of the two piston-cylinder devices, said pressure lines (18, 19) being branched (25A, 26A) such as to balance pressure actuation (at 25, 26) of the directional valve (17) when adjusting the position of the valve to either one of its terminal positions.

2. A steering system according to claim 1, wherein a branch line (16B, 16C) between the directional valve (17) and the pump (10) incorporates therein an auxiliary valve (27) which is pressure actuated in one direction and which is held in a neutral position by a spring (28), in which position the auxiliary valve interrupts the connection between the directional valve and the pump when the directional valve occupies its central position and the pressure in the branch line lies beneath the pre-determined value, whereas when the steering oil-pressure increases to a level above the predetermined value the auxiliary valve (27) is adjusted to an open position against the action of the spring.

3. A steering system according to claim 2, wherein during its adjustment to its open position in response to a first pressure control (30), the auxiliary valve (27) activates a second pressure control (31) when said auxiliary valve occupies its open position, said pressure control (31) functioning to counter-act oscillation of the auxiliary valve (27) due to pressure variations occurring when the auxiliary valve is opened.

* * * * *